United States Patent [19]
McNeil

[11] Patent Number: 5,265,981
[45] Date of Patent: Nov. 30, 1993

[54] SYSTEM AND METHOD FOR REHABILITATING A MANHOLE, AND MANHOLE REHABILITATED THEREBY

[76] Inventor: Ronald A. McNeil, 5413 Parkview Rd., Graceville, Fla. 32440

[21] Appl. No.: 892,822

[22] Filed: Jun. 5, 1992

[51] Int. Cl.⁵ .......................................... E02D 29/12
[52] U.S. Cl. .................................. 405/303; 156/287; 156/294; 138/97; 264/516; 428/225; 428/232; 405/133; 405/155; 405/150.1
[58] Field of Search ............... 405/154, 155, 146, 303, 405/132, 133, 150.1; 264/516; 138/97; 428/225, 232, 246, 247; 156/287, 294

[56] References Cited

U.S. PATENT DOCUMENTS

| | | | |
|---|---|---|---|
| 1,369,151 | 2/1921 | Winterrath | 428/232 |
| 3,511,734 | 5/1970 | Darrow | 156/287 |
| 3,769,144 | 10/1973 | Economy et al. | 428/225 |
| 4,009,063 | 2/1977 | Wood | 156/71 |
| 4,135,958 | 1/1979 | Wood | 156/199 |
| 4,182,262 | 1/1980 | Eucrson et al. | 118/44 |
| 4,256,525 | 3/1981 | Allen | 156/245 |
| 4,640,313 | 2/1987 | Stanley | 156/287 X |
| 4,714,095 | 12/1987 | Muller et al. | 156/287 X |
| 4,762,585 | 8/1988 | Schneider et al. | 156/287 X |
| 4,776,370 | 10/1988 | Long, Jr. | 138/98 |
| 4,778,553 | 10/1988 | Wood | 156/287 |
| 4,846,822 | 7/1989 | Foxman | 428/246 X |
| 4,861,634 | 8/1989 | Renaud | 428/36.1 |
| 4,936,715 | 6/1989 | Wood | 405/150 |
| 4,956,041 | 9/1990 | Miyazaki et al. | 156/267 |
| 4,965,036 | 10/1990 | Miyataki et al. | 264/269 |
| 4,994,317 | 2/1991 | Dugan et al. | 428/246 |
| 5,106,440 | 4/1992 | Tangeman | 156/94 |

FOREIGN PATENT DOCUMENTS 2113608  8/1983  United Kingdom .

*Primary Examiner*—Dennis L. Taylor
*Attorney, Agent, or Firm*—Joseph W. Berenato, III

[57] ABSTRACT

A liner assembly for a manhole comprises a multiple ply generally cylindrical tube. The outermost ply is adapted for being impregnated with material for rigidifying and bonding the outermost ply to a manhole. The innermost ply is adapted for being impregnated with a material for rigidifying the innermost ply so that the manhole becomes structurally reinforced. An impermeable ply is disposed between the innermost and outermost plies. The outermost, innermost, and impermeable plies are secured together so that the plies are maintained facially oriented. Each of the plies is cut along a first end of the tube for providing a fluid flow path when the assembly is installed in the manhole and an opposite end of the tube is fully opened.

24 Claims, 3 Drawing Sheets

SYSTEM AND METHOD FOR REHABILITATING A MANHOLE, AND MANHOLE REHABILITATED THEREBY

BACKGROUND OF THE INVENTION

Waste water is transported through a system of pipes, known as sewers, from the point of generation to a remote treatment or disposal site. The sewers are usually buried anywhere from ten or more feet below the surface and access to the generally horizontal sewer sections is normally provided by a vertically disposed manhole. The manhole has an opening at the surface or grade level. The lower or invert end of the manhole has a flow path, known as a lateral, through which sewage flows on its way to the treatment plant. The manhole may be formed of cement, concrete or brick, and typically has an internal diameter many times greater than the diameter of the flow path of the lateral.

Sewage, as known to those skilled in the art, may generate an atmosphere which is damaging to the mortar with which the brick manhole is formed. Alternatively, the environment may be damaging to the cementitious material used in manufacturing the manhole. There is a need, therefore, to rehabilitate or repair the damaged manhole, both in order to maintain proper flow of sewage and to preserve the integrity of the sewage system during periods of heavy rainfall or subsurface water infiltration. Should the mortar be destroyed, then rainfall or surface water may enter the manhole, thereby overloading the sewage system and potentially causing untreated sewage to be discharged into streams, lakes, and the like. Preserving the structural integrity of the manhole is one means of minimizing the load applied to a sewage pumping treatment plant. These problems also apply to sewage stations which may be located along the sewage collection system, and which therefrom also require rehabilitation.

OBJECTS AND SUMMARY OF THE INVENTION

The primary object of the disclosed invention is a system for rehabilitating manholes so that structural integrity is preserved and water infiltration prevented.

An additional object of the invention is to provide a system for rehabilitating a manhole by use of a pre-fabricated multiple ply tube, wherein inner and outer tube layers are made rigid by an epoxy resin system and have disposed therebetween a water, gas and chemical impermeable sheet or non-porous membrane.

A liner assembly for a manhole comprises a multiple ply tube. The outermost ply is adapted for being impregnated with a material which rigidifies and bonds the outermost ply to a manhole. The innermost ply is adapted for being impregnated with a material which rigidifies the innermost ply so that the manhole is structurally reinforced. A water, gas and chemical impermeable ply is disposed between the innermost and outermost plies. The outermost, innermost, and impermeable plies are secured together so that the plies are maintained facially oriented. Each of the plies is cut along a first end of the tube for providing a fluid flow path when the assembly is installed in the manhole and an opposite end of the tube is fully opened. A polymeric strippable inflation bladder overlies the innermost ply and is removable therefrom after the innermost ply has rigidified. The bladder covers the flow path for permitting the tube to be inflated by means connected to the open end.

A manhole liner comprises a generally cylindrical tube comprising first, second, and third oriented plies. The first and third plies are formed from a woven structural material and the second ply is disposed between the first and third plies and is formed from an impermeable membrane material. Each of the plies is cut along a first end of the tube for providing a fluid flow path when the tube is positioned within a manhole and an opposite end of the tube is fully opened. A first material impregnates the first ply for bonding the first ply to the manhole and for rigidifying the first ply. A second material impregnates the third ply for rigidifying the third ply. A strippable polymeric inflation bladder overlies the impregnated third ply and is removable therefrom after the third ply has rigidified. The bladder covers the fluid flow path for permitting the tube to be inflated through the opposite open end.

The method of rehabilitating a manhole comprises the steps of providing a contoured tube comprised of first, second, and third juxtaposed plies. The first and third plies are formed from a woven structural fabric and the second ply is disposed between the first and third plies and is formed from a sheet material impermeable to water, gas and chemical attack. The tube has a first end which is open and an opposite second end which is cut to provide a fluid flow path. The first and third plies are impregnated with an epoxy resin system. The impregnated first ply and the fluid flow path are covered with a polymeric inflation bladder. The tube is positioned within a manhole so that the third ply is juxtaposed to the wall of the manhole and the second end is aligned with a lateral within the manhole. The tube is inflated with a pressurized heated fluid so that the tube conforms to the manhole. Heated fluid continues to be supplied to the tube until the first and third plies have rigidified. The bladder is then stripped from the tube.

A rehabilitated manhole comprises a vertically disposed manhole having an open upper end and a lower end having at least one lateral. A reinforcing system is positioned within the manhole. The reinforcing system includes a support tube assembly comprising first, second, and third juxtaposed layers with the first and third layers formed from a woven structural material and the second layer disposed between the first and third layers and formed from a sheet impermeable to water, gas and chemical attack. Each of the first and third layers is impregnated with an epoxy resin system so that the layers are rigidified and thereby support the manhole and further so that the third layer is bonded to the manhole, and the first and third layers bonded to the second layer. Each of the layers is cut proximate the lateral for forming a fluid flow path therewith.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein.

DETAILED DESCRIPTION OF THE INVENTION

Figure 1:
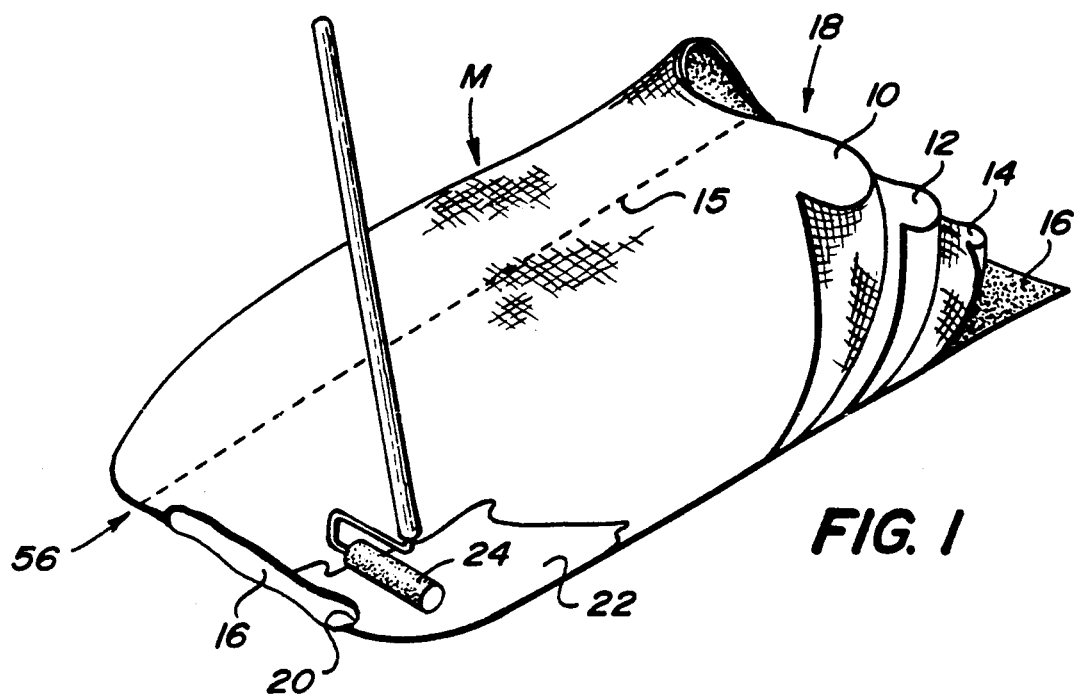
FIG. 1 is a schematic view of the support tube of the invention.
Figure 2:
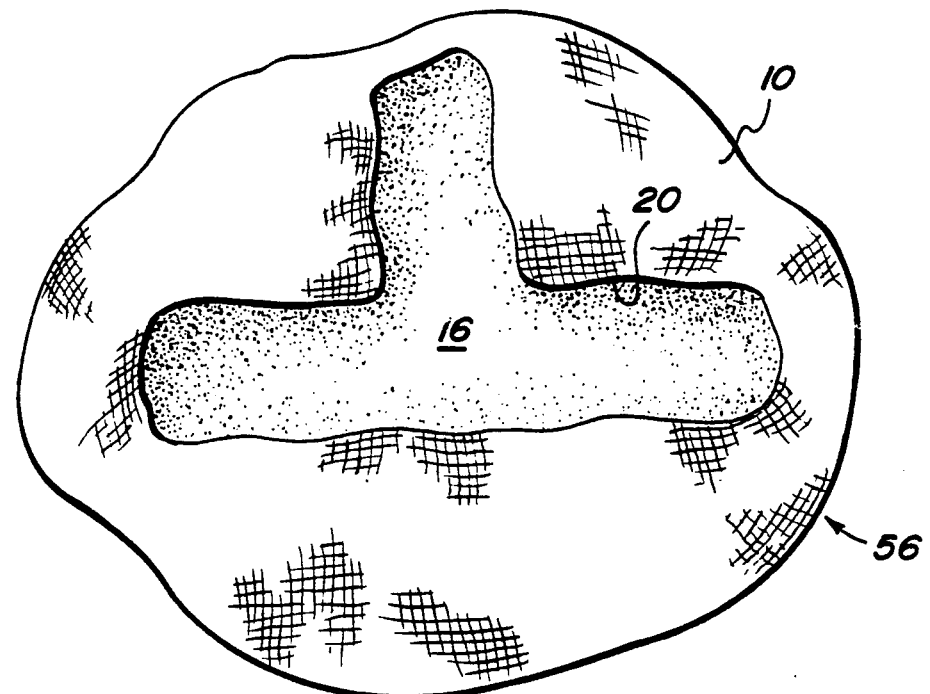
FIG. 2 is a bottom plan view of the support tube of the invention illustrating the strippable inflation bladder covering the fluid flow path.

Manhole support structure M, as best shown in FIG. 1, is a generally cylindrical tube comprised of plies 10, 12, and 14. An inflation bladder 16, as best shown in FIGS. 1 and 2, overlies the ply 14, but is selectively removable therefrom. The support assembly M has an open end 18 and an opposite closed end which has a contoured cut 20 therein.

The support assembly M, as noted earlier, is formed from a plurality of plies 10, 12, and 14 which are facially disposed in the order named. Respective edges of the plies are secured together, such as by stitching 15 with a double needle machine, in order to create the generally tubular configuration of the support assembly M. The stitching also serves to maintain the plies 10, 12, and 14 in their facially disposed orientation during fabrication of the support assembly M and its subsequent installation. While the tube M is disclosed as being cylindrical, it may have whatever shape is called for by the structure to be rehabilitated.

The plies 10 and 14 are both formed from a woven structural-type fiberglass, such as may be purchased from Certainteed Fiberglass. I prefer that the fiberglass be a 24 oz. woven roving in order to provide adequate structural integrity for the use to which the manhole support assembly M is to be put. The ply 12, on the other hand, is a non-porous fabric, impermeable to water, gas and chemical attack, which provides strength to the assembly M during manufacture and installation, and also prevents migration of water, gas and chemicals from the ply 10 to the ply 14. I have found that an appropriate non-porous sheet material for the ply 12 may be purchased from Cooley, Inc. The material is a 12 oz. extrusion coated alloy based upon the COOL-GUARD ® formula. The underlying base fabric is an L 10 KUP polyester material. The polyester fabric has a three part alloy coating applied thereto. The coating comprises polyvinyl chloride, chlorinated polyethylene, and Elvaloy ®, so that the polyester fabric is encased in a vinyl blanket so as to resemble a membrane. The base fabric is a 20×10 material, which has a 1.27 oz. weight. Ply 12 has a thickness less than that of plies 10 and 14.

The bladder 16, on the other hand, is a vinyl sheet material which is selectively removable from the ply 14 in order to open the cut 20. The bladder 16 prevents damage to the support assembly M during the installation phase, and also permits inflation of the support assembly M during installation because the cut opening 20 is closed as a result.

Each of the plies 10 and 14 is impregnated with an epoxy resin system prior to installation of the support assembly M. The epoxy resin system causes the fiberglass layers 10 and 14 to be rigidified after being appropriately cured, while being bonded also to the ply 12. The epoxy resin system furthermore causes the ply 10 to be bonded to the surrounding walls of the manhole, thereby providing structural support for the manhole because the epoxy resin system fills the openings left by damaged or removed mortar, or the like.

The epoxy resin system 22 may be applied to the support assembly M through a simple roller 24 which spreads the resin system 22 over the plies 10 and 14. Each of the plies 10 and 14 should be thoroughly impregnated by resin 22. In practice, the outer two layers of the support assembly M are peeled back, much like socking and unsocking two tube socks, and the resin is initially applied to the ply 14, after which the bladder 16 is then applied. The support assembly M is then realigned with the interior fiberglass layer and the inflation bladder, and the epoxy resin system 22 then applied to the ply 10.

I have found that the epoxy resin system should be a two component resin system. A preferred resin and hardener are sold by Reichhold Chemicals, Inc. The resin is Epotuf 37-140, and the hardener is Epotuf 37-620. The Epotuf resin is a bisphenol-A diglycidyl ether, and has an equivalent weight of 180–190 and is an undiluted medium/high viscosity resin. The hardener, on the other hand, is a polyamide curing agent and has a viscosity of about 400–700 and an amine value of 400–450. The resin and hardener, as blended below, has a viscosity of 1000–1,800 centipoise.

A preferred formulation for the resin component is to mix 90 oz. of titanium dioxide with 10 gal. of Epotuf 37-140 resin. The material is ground to a 6+ Hegman, and then let down at slow speed and an additional 45 gal. of the resin added.

A preferred hardener formulation, on the other hand, comprises 10 gal. of Epotuf 37-620, into which 50 lbs. of talc and 13.5 oz. of colorant have been added. The mixture is ground to a 6+ Hegman, and then let down to a slow speed and an additional 17 gal. of the hardener added.

The epoxy resin system, as noted, is a two component system, and I prefer that there be 50–100 parts of hardener to each 100 parts of resin. Those skilled in the art will appreciate that modifying the ratio of the hardener formulation as a function of the resin formulation is one means for accelerating the curing of the resin and otherwise adjusting its physical parameters. In addition, while I prefer the use of an epoxy resin system, various other compositions may be utilizied.

Figure 4:
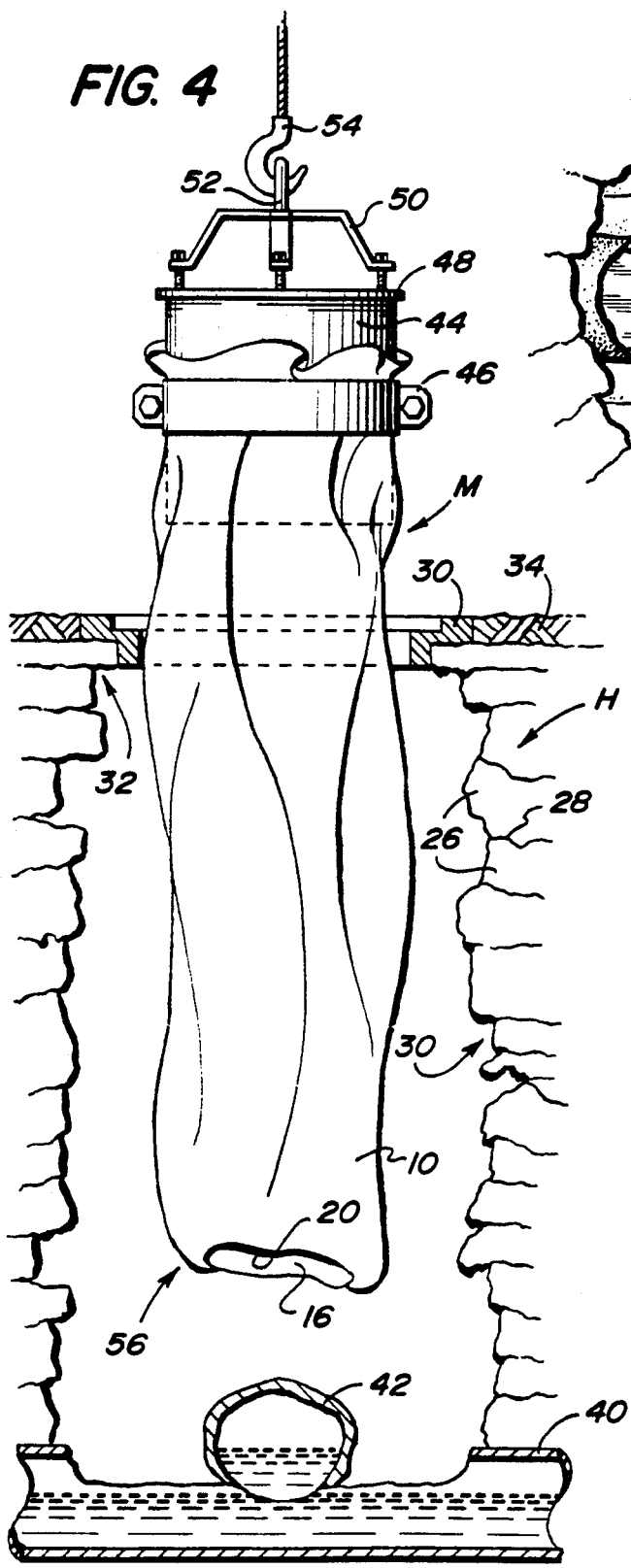
FIG. 4 is an elevational view, partially in section, illustrating the support tube of FIG. 1 being positioned within the manhole of FIG. 3.
Figure 3:
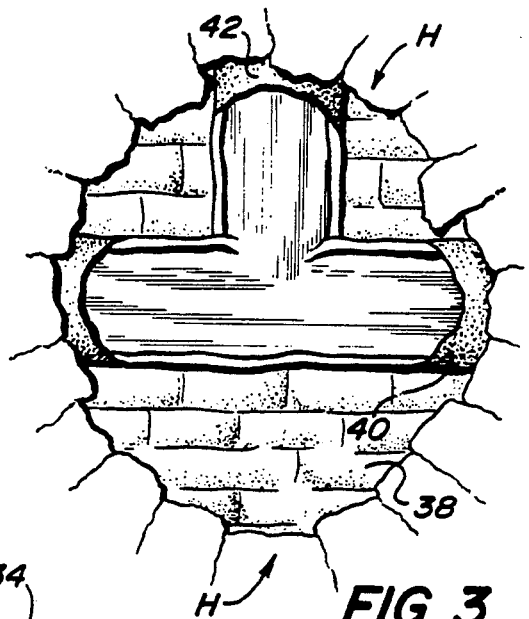
FIG. 3 is a top plan view of a manhole which is to be rehabilitated.

Manhole H, as best shown in FIGS. 3 and 4, is a brick manhole which has bricks 26 secured together by mortar 28. The faces 30 of the bricks 26 have become irregular due to the damaging environment to which the faces 30 have been exposed. Likewise, the mortar 28 also has been damaged or removed by the environment, with the result that the bricks 26 are spalling and/or being loosened and removed. Removal of the bricks 26 and/or the mortar 28 permits water or like material to enter the manhole H during rain and similar events. The manhole H should be protected from infiltration by water. Rain water and subsurface water do not require sewage treatment, and to permit this water infiltration into the manhole H will needlessly overload the sewage treatment plant, and potentially even cause a catastrophic upset.

Manhole H has a seat 30 at its upper end 32. The seat 30 receives a sealing cover which prevents access to the manhole H except as may be required. The seat 30 is, preferably, at the grade level of street 34 as is conventional.

The lower or invert end of manhole H has a floor or support 38, as best shown in FIG. 3. The floor 38 is typically manufactured from the same materials as the vertical walls of the manhole H. The floor 38 likewise will tend to become damaged due to the environment to which it is exposed, and I therefore frequently find it necessary to repair the floor 38 prior to proceeding with insertion of the manhole support assembly M into the manhole H. The floor 38 may be patched with various types of materials, such as mastic, cement, and the like.

FIGS. 2 and 3 illustrate main lateral 40 which is formed into the floor 38. A secondary lateral 42 likewise is formed into floor 38. The main lateral 40 is a primary conduit for transporting waste water from the source to the treatment facility. Secondary lateral 42, on the other hand, serves to bring additional waste water into the main lateral 40 for similar reasons. The laterals 40 and 42 are of conventional design, and frequently are formed from a cement, clay, PVC or iron pipe. The laterals 40 and 42, as best shown in FIG. 3, are opened within the manhole H for reasons of maintenance of their connected sewer lines.

Rehabilitation of the manhole H must be performed in a manner permitting the laterals 40 and 42 to perform their necessary function during the rehabilitation phase. The flow of waste water through the laterals 40 and 42 usually cannot be stopped while rehabilitation proceeds, because the users of the system frequently have no other choice for the disposition of waste water.

Use of the manhole support assembly M of FIG. 1 for rehabilitation of the manhole H of FIGS. 3 and 4 proceeds relatively quickly, requiring only a few hours for preparation of the manhole support assembly M and of the manhole H. As earlier noted, I have found it desireable to repair the floor 38 of the manhole H prior to beginning rehabilitation. I have also found it appropriate to clean the exposed faces 3 of the bricks 26, or the corresponding cement surface if the manhole H is formed of a cementious pipe, with an acetic acid pressurized bath. A dilute solution of acetic acid will relatively rapidly remove the dirt and grime which the exposed faces 30 of the bricks 26 may have, thereby providing a better bonding site for the manhole support assembly M. In addition, because the acetic acid is sprayed onto the exposed surfaces of the manhole H at a relatively high pressure, then loose brick, mortar, and the like will be removed. Removal of weakened material permits a better bond to be maintained, and helps to expose relatively large spalled areas which may initially require patching with mastic or the like.

Prior to beginning rehabilitation of the manhole H, I have found it desireable to take measurements or to review accurate blueprints so that the manhole support assembly M may be fabricated to substantially correspond to the contour of the manhole H. Although I have illustrated the manhole H and its corresponding support assembly M as being generally cylindrical in configuration, those skilled in the art will appreciate that the manhole H may have any shape. The manhole support assembly M is manufactured to substantially correspond to the configuration and at least the size of the manhole H, thereby substantially eliminating any gapping which could occur between the manhole support assembly M and the surfaces of the manhole H. I have found that the manhole support assembly M can be appropriately fabricated by conventional sewing techniques, and the stitching 15 resulting from those techniques achieves the added benefit of securing the plies 10, 12, and 14 together. Each of the plies 10, 12, and 14 is normally rectangular in plan, so that the manhole support assembly M requires that respective edges of the plies be secured together, preferably by double needle stitching, in order to create the tubular configuration of FIG. 1, or whatever other configuration may be required to match the contour of the manhole M. Additional stitching may also be provided as necessary.

Figure 5:
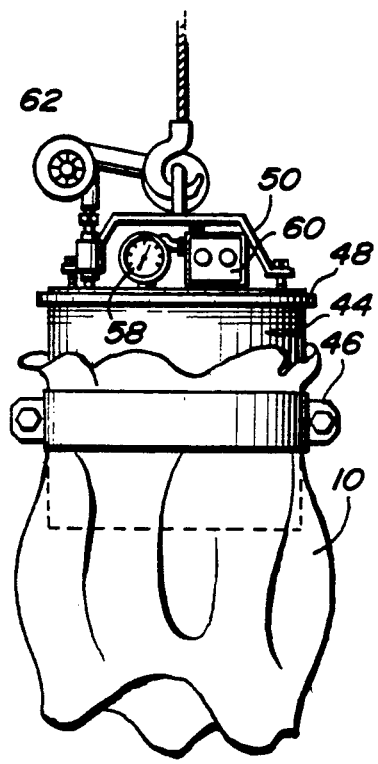
FIG. 5 is a fragmentary elevational view of the support tube of FIG. 4 illustrating the system for introducing pressurized heated air.

After the plies 10 and 14 of the manhole assembly M have been thoroughly impregnated with the resin system 22, then a support tube 44 is inserted within the manhole support assembly M, as best shown in FIG. 4. Clamp 46 is then secured about the exterior of the manhole support assembly M and the support tube 44, for thereby securing the manhole support assembly M to the tube 44. The tube 44 is closed by plate 48, as best shown in FIGS. 4 and 5, so that the interior of the manhole support assembly M, because of the inflation bladder 16, becomes a sealed container.

Lifting bracket 50 has a clevis 52 for receipt of hook 54 from a lifting crane or the like (not shown). The manhole support assembly M is lowered into manhole H by the hook 54, as best shown in FIG. 4, to the depth necessitated for repair. The manhole support assembly M should have its lower end 56 positioned on floor 38 of the invert, with the cut portion 20 aligned with the laterals 40 and 42. The radial dimension of the manhole support assembly M, on the other hand, is at least equal to that of the manhole H so as eliminate any gap between the ply 10 and the adjacent faces 30 of the bricks 26. Should the assembly M be somewhat larger than manhole H, then the additional material will merely fold onto itself.

After the manhole support assembly M has been appropriately positioned within the manhole H, then the assembly M is pressurized with heated air in order to cause the manhole support assembly M to inflate and contact the walls of the manhole H, comprising the floor 38 and faces 30, and to cure the resin system impregnating the plies 10 and 14. I have found that the manhole support assembly M should be pressurized to about 500 lbs. per sq. ft., or whatever pressure is required to eliminate infiltration while installation and curing occurs, with air heated to a temperature of 250° F. FIG. 5 illustrates pressure gauge 58, digital thermometer 60, and hot air blower 62 connected to plate 48 and communicating with the interior of assembly M. While I have illustrated the blower 62 as being connected to the plate 48, the blower 62 typically will be adjacently located and connected to the support assembly M via flexible pressurization hoses.

I have found that a pressure of about 500 lbs. per sq. ft. is sufficient to cause the manhole support assembly M to be sufficiently inflated so that the ply 10, because of its size, contacts the exposed faces 30 of the bricks 26 and is maintained in contact. The bladder 16, because it blocks the cut opening 20, keeps the heated air within the inflated manhole support assembly M throughout the curing operation. The resin system 22 remains in contact because of the force applied as a result of the inflation bladder. About 30 seconds are required to inflate the manhole support assembly M, and, because the air is heated to 250°, cure commences almost immediately. I have found that approximately 1 to 1½ hours are required to elevate the temperature of the resin system which impregnates the ply 14 to a temperature of about 200° F., which represents complete cure. Because of the inflation of the manhole support assembly M, then the resin system impregnating the ply 10 is forced into the openings and interstices in the faces 30 of the bricks 26 and mortar 28, thereby providing maximum surface area for binding of the manhole support assembly M.

As earlier noted, a damaged manhole, such as the manhole H, may have loose mortar, spalled bricks, and the like, all of which may permit adjacent subsurface water to infiltrate into the manhole H. The resin system 22 applied to the ply 10, because of its extremely viscous nature after curing has progressed, fills most of the relatively small openings through which water might infiltrate the manhole H. The resin system and the non-porous membrane 12 prevent water infiltration both during the rehabilitation process, and subsequent thereto when rehabilitation has been completed. Should some water, however, initially be present in an amount or pressure sufficient to remove the resin 22 at the situs of water infiltration, then the non-porous membrane 12 prevents the resin 22 impregnating the ply 14 from likewise being diminished. The integrity of the resin system impregnating the ply 14 is therefore maintained, as is the resinated liner as it presses against every contact point with the manhole H, so that water infiltration into the manhole H through the support assembly M is totally eliminated. Thus, the manhole support assembly M prevents subsurface and other unwanted water from reaching the laterals 40 and 42.

Figures 6, 7:
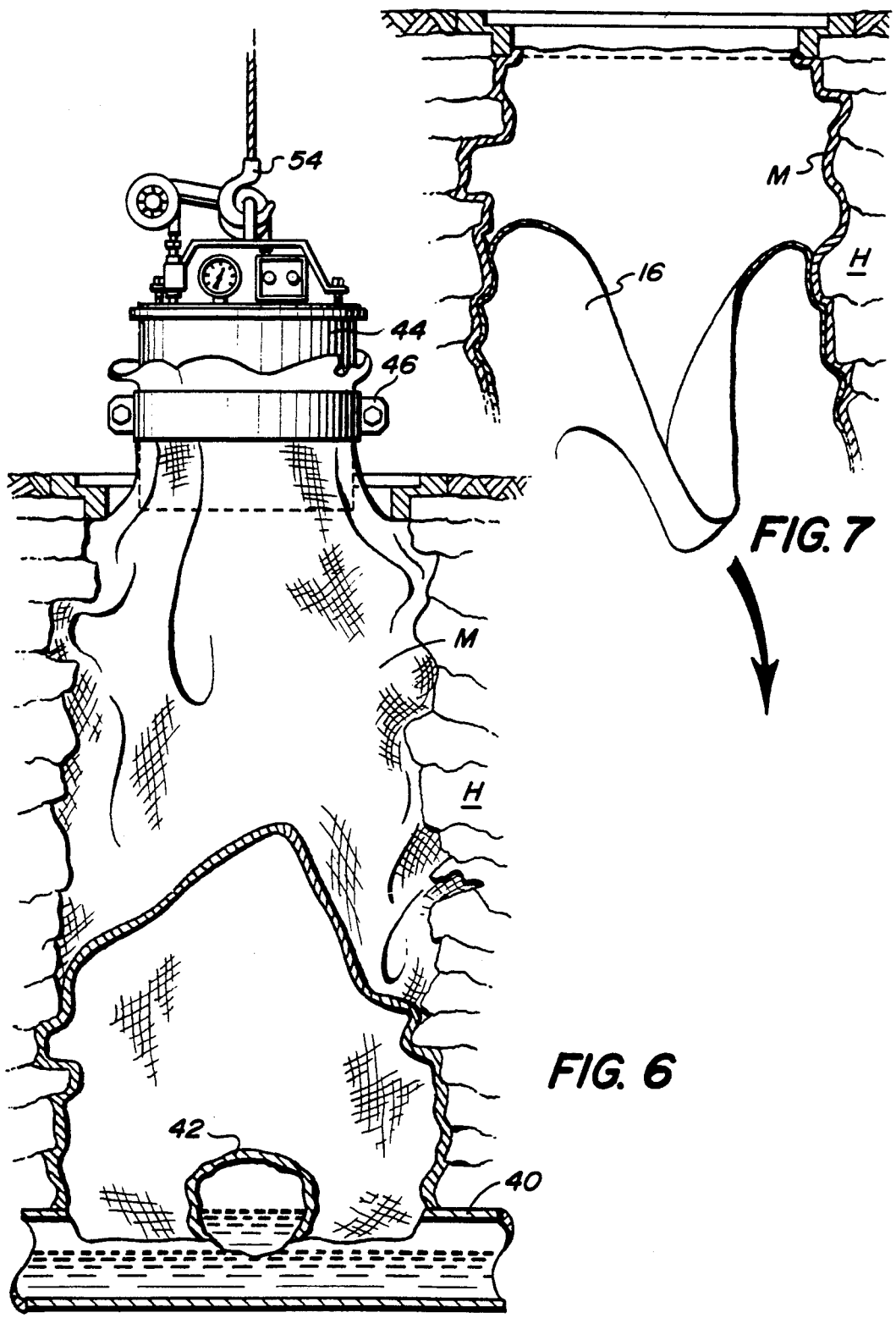
FIG. 6 is an elevational view, partially in section, of the manhole of FIG. 4 after the support tube has been inflated.
FIG. 7 is an elevational view, partially in section, of the manhole of FIG. 6 while the strippable bladder is being removed.

FIG. 6 illustrates the manhole support assembly M when positioned within the manhole H and after having been inflated with pressurized heated air. It can be seen in FIG. 6 that the manhole support assembly M and the resin system impregnating the ply 10 intimately engage the exposed faces 30 of the bricks 26, and also permit the laterals 40 and 42 to be preserved. The intimate engagement of the ply 10 and its impregnated resin with the bricks 26 and mortar 28 of the manhole H not only stops water infiltration and gaseous and chemical deterioration in the manhole H, but also provides structural support thereafter. The resin 22 impregnating the ply 10 causes the ply 10 to be rigidified. The ply 10 is formed from a structural-type of fiberglass, so that it provides substantial support to the manhole H thereafter. The ply 14 is likewise formed from a structural fiberglass, and the resin system 22 impregnating the ply 14 likewise causes the ply 14 to become rigidified. The rigidified plies 10 and 14 thereby provide structural support to the manhole H, substantially increasing the usable life. In addition, the rigidified ply 14 also protects the non-porous ply 12 thereafter, such as when the manhole H may subsequently be accessed for inspection, line cleaning, or televising of sewer lines within the system. It is not unusual to access manholes with ladders, harnesses and other devices and to use different types of equipment within the manhole structure. Such equipment could, however, tear the non-porous ply 12, so as to permit water infiltration. Therefore, the bonding of the two structural layers of resin impregnated fiberglass is important because one layer bonds to the existing surface while the other protects the non-porous inner membrane 12.

After the resin system impregnating the plies 10 and 14 has been sufficiently cured, then the bladder 16 is removed, as best shown in FIG. 7. The bladder 16 is, as noted, a vinyl sheet which does not bind to the resin system impregnating the ply 14. After curing of the resin system, the non-porous membrane 12 provides a permanent barrier to stop further deterioration of the manhole H from gases or chemicals and eliminates any infiltration or exfiltration. The bladder 16, when removed, uncovers the cut portion 20 which surrounds the laterals 40 and 42 so as to permit access to them. Access to the laterals 40 and 42 is necessary in the event their sewer lines should become blocked or otherwise require service. The bladder 16 may be relatively easily removed, and it may be used in a subsequent rehabilitation. After removal of bladder 16, all lateral openings, whether on the floor 38 of the manhole H or on the walls may be reopened with the use of an offset cutting wheel or like device.

While this invention has been described as having a preferred design, it is understood it is capable of further modifications, uses and/or adaptations of the invention following the general principle of the invention and including such departures from the present disclosure has come within known or customary practice in the art to which the invention pertains, and as may be applied to the central features hereinbefore set forth, and falls in the scope of the invention of the limits of the appended claims.

What I claim is:

1. A liner assembly for sealing and reinforces the walls of a manhole, comprising:
 a) a multiple ply contoured tube, the outermost ply adapted for being impregnated with a material for rigidifying and binding said outermost ply to the interior of a manhole and the innermost ply adapted for being impregnated with a material for rigidifying said innermost ply so that the interior of the manhole is structurally reinforced;
 b) a ply impermeable to fluids disposed between said innermost and outermost plies;
 c) means securing said outermost, innermost, and impermeable plies together so that said plies are facially oriented; and
 d) each of said plies is cut along a first end of said tube for providing a fluid flow path when said tube is installed in a manhole and an opposite end of said tube is fully opened.

2. The assembly of claim 1, wherein:
 a) a polymeric strippable bladder overlies said innermost layer and is removable therefrom after said innermost ply has been rigidified, said bladder covers said flow path for permitting said tube to be inflated by means connectable to said open end.

3. The liner assembly of claim 2, wherein:
 a) each of said innermost and outermost plies is a woven fabric.

4. The assembly of claim 3, wherein:
 a) each of said fabrics is fiberglass.

5. The assembly of claim 2, wherein:
 a) each of said innermost and outermost fabrics is fiberglass, and said strippable bladder is vinyl.

6. The assembly of claim 4, wherein:
 a) said impermeable ply is polymeric.

7. The assembly of claim 6, wherein:

a) said impermeable ply is a fabric having a coating applied thereto.

8. The assembly of claim 1, wherein:
a) each of said innermost and outermost plies is adapted for being impregnated with an epoxy resin system.

9. The assembly of claim 1, wherein:
a) said innermost, impermeable, and outermost plies are secured together by stitching.

10. A liner for sealing and reinforcing a manhole, comprising:
a) a generally cylindrical tube comprising first, second, and third oriented plies, said first and third plies formed from a woven structural material and said second ply is disposed between said first and third plies and formed from a membrane impermeable to fluids;
b) each of said plies is cut along a first end of said tube for providing a fluid flow path when the tube is positioned within a manhole and an opposite end thereof is fully opened;
c) a first material impregnates said first ply for bonding said first ply to the interior surfaces of a manhole and for rigidifying said first ply;
d) a second material impregnates said third ply for rigidifying said third ply; and
e) a polymeric bladder overlies said impregnated third ply and is removable therefrom after said third ply has been rigidified, said bladder covers said flow path while said first and second materials are rigidifying for permitting said tube to be inflated through said opposite end.

11. The liner of claim 10, wherein:
a) each of said first and second materials is an epoxy resin system.

12. The liner of claim 11, wherein:
a) the epoxy resin system is a two component blend, one component of which is a bisphenol-A diglycidyl ether.

13. The liner of claim 11, wherein:
a) each of said first and third plies is fiberglass.

14. The liner of claim 13, wherein:
a) said second ply is a coated polymeric fabric.

15. The liner of claim 14, wherein:
a) said second ply is a coated polyester, and said bladder is vinyl.

16. The method of rehabilitating a manhole, comprising the steps of:
a) providing a contoured tube comprised of first, second, and third juxtaposed plies, the first and third plies formed from a woven structural fabric and the second ply disposed between the first and third plies and formed from a membrane impermeable to fluids, the tube having a first open end and an opposite second end which is cut to provide a fluid flow path;
b) impregnating the first and third plies with an epoxy resin system;
c) covering the impregnated first ply and the fluid flow path with a polymeric bladder;
d) positioning the tube within a manhole so that the third ply is juxtaposed to the interior surfaces of the manhole and the second end is aligned with an internal lateral within the manhole;
e) inflating the tube with a heated fluid so that the tube contacts the internal surfaces and lateral of the manhole and continuing to supply heated fluid until the first and third plies have rigidified; and
f) stripping the bladder from the tube.

17. The method of claim 16, including the steps of:
a) inflating the tube with heated air; and
b) continuing to supply heated air until the first ply has obtained a temperature sufficient to cure the system.

18. The method of claim 16, including the steps of:
a) circulating heated air within the tube as the fluid, the air having a temperature of about 250° F.; and
b) continuing to circulate heated air for at least one hour.

19. The method of claim 16, including the steps of:
a) providing a tube having first and third plies formed from structural fiberglass and the second ply formed from a coated polyester fabric; and
b) providing a vinyl sheet as the bladder.

20. A rehabilitated manhole, comprising:
a) a vertically disposed manhole having an upper end, internal walls, and a lower end with at least one lateral;
b) a reinforcing system positioned within said manhole, said reinforcing system including a support tube assembly comprising first, second, and third juxtaposed layers with said first and third layers formed from a woven structural material and said second layer being disposed between said first and third layers and formed from a membrane impermeable to fluids;
c) each of said first and third layers is impregnated with an epoxy resin system so that said first and third layers are rigidified and thereby seal and reinforce said manhole and so that said third layer is bonded to said internal walls and lower end of said manhole; and
d) each of said layers is cut proximate said lateral for permitting access thereto.

21. The assembly of claim 1, wherein:
a) said ply disposed between said innermost and outermost plies is impermeable to liquids.

22. The liner of claim 10, wherein:
a) said second ply is impermeable to liquids.

23. The method of claim 16, including the step of:
a) providing as the membrane of the second ply a material impermeable to liquids.

24. The manhole of claim 20, wherein:
a) said membrane is impermeable to liquids.

* * * * *